United States Patent
Takenoiri et al.

(10) Patent No.: US 8,197,891 B2
(45) Date of Patent: Jun. 12, 2012

(54) PERPENDICULAR MAGNETIC RECORDING MEDIUM AND METHOD FOR MANUFACTURING SAME

(75) Inventors: Shunji Takenoiri, Nagano (JP); Yasushi Sakai, Nagano (JP)

(73) Assignee: Fuji Electric Co., Ltd. (JP)

( * ) Notice: Subject to any disclaimer, the term of this patent is extended or adjusted under 35 U.S.C. 154(b) by 279 days.

(21) Appl. No.: 12/123,809

(22) Filed: May 20, 2008

(65) Prior Publication Data

US 2008/0220157 A1    Sep. 11, 2008

Related U.S. Application Data

(62) Division of application No. 11/042,793, filed on Jan. 25, 2005, now abandoned.

(30) Foreign Application Priority Data

Jan. 28, 2004  (JP) .................................. 2004-020427

(51) Int. Cl.
*G11B 5/84* (2006.01)

(52) U.S. Cl. ........................................................ 427/131

(58) Field of Classification Search .................. 427/128, 427/129, 130, 131, 132
See application file for complete search history.

(56) References Cited

U.S. PATENT DOCUMENTS

| | | | | |
|---|---|---|---|---|
| 4,729,924 A * | 3/1988 | Skorjanec et al. | ............ | 428/422 |
| 4,828,905 A * | 5/1989 | Wada et al. | ................... | 428/213 |
| 5,000,984 A * | 3/1991 | Wakai et al. | ................... | 427/132 |
| 5,143,794 A * | 9/1992 | Suzuki et al. | ................. | 428/611 |
| 6,174,597 B1 * | 1/2001 | Yusu et al. | ................... | 428/332 |
| 2002/0127433 A1 | 9/2002 | Shimizu et al. | | |
| 2005/0186450 A1 | 8/2005 | Takenoiri et al. | | |
| 2006/0014052 A1 | 1/2006 | Watanabe et al. | | |

FOREIGN PATENT DOCUMENTS

| | | | |
|---|---|---|---|
| JP | 10-134333 A | 5/1998 |
| JP | 10-233015 A | 9/1998 |
| JP | 10-320772 A | 12/1998 |
| JP | 2000-306228 A | 11/2000 |
| JP | 2000-311329 A | 11/2000 |
| JP | 2001-101613 A | 4/2001 |
| JP | 2001-202611 A | 7/2001 |
| JP | 2002-025030 A | 1/2002 |
| JP | 2002-074639 A | 3/2002 |
| JP | 2002-334414 A | 11/2002 |

OTHER PUBLICATIONS

Office action issued in corresponding Japanese patent application No. 2004-020427, dated Jul. 18, 2008.
Office Action issued in corresponding Chinese application No. 2004100866405, dated Jan. 25, 2008.
Search Report issued in corresponding Malaysian application No. PI20045004, mailed Oct. 23, 2007.

* cited by examiner

*Primary Examiner* — Michael Cleveland
*Assistant Examiner* — Tabassom Tadayyon Eslami
(74) *Attorney, Agent, or Firm* — Rossi, Kimms & McDowell LLP

(57) ABSTRACT

A perpendicular magnetic recording medium is disclosed in which each magnetic crystal grain in the magnetic recording layer has a multilayer structure and has a configuration like a truncated cone shape, in which the crystal grain of the final layer deposited in the film surface side at the final stage is smaller than the diameter of the crystal grain in the initial layer deposited on the substrate side at the initial stage. The invention improves S/N (signal output to noise ratio) by enhancing signal output and reducing noises. The medium is produced by a simple manufacturing method suitable for mass production, and provides a medium of high recording density by improving recording resolution.

6 Claims, 8 Drawing Sheets

Film Deposition Process of
Oxygen Addition Type

Sputter CoCrPt–SiO$_2$ in Ar Gas

Magnetic Crystal Grain (Co, Cr, Pt, Si)

Nonmagnetic Grain Boundary (Mainly Oxides of Si and Cr)

Repeat Varying Amount of O$_2$

Intermittent Film Deposition Process of Oxygen Exposure Type
FIG. 5(a)  Deposition of CoCrPt-SiO$_2$
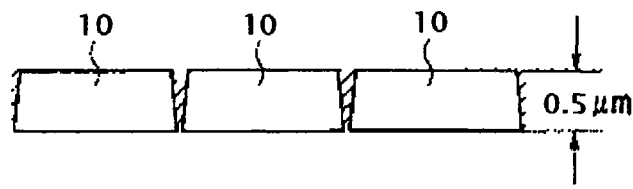
FIG. 5(b)  Oxygen Exposure
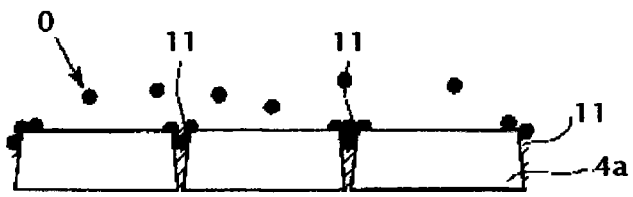
FIG. 5(c)  Deposition of CoCrPt-SiO$_2$
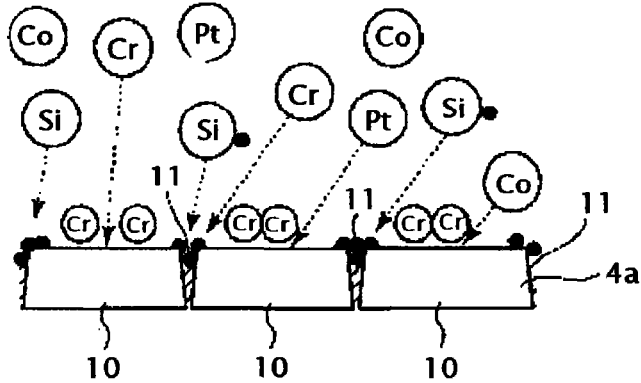
FIG. 5(d)  After Deposition of CoCrPt-SiO$_2$
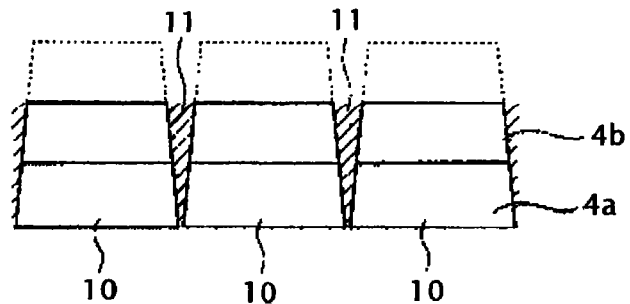

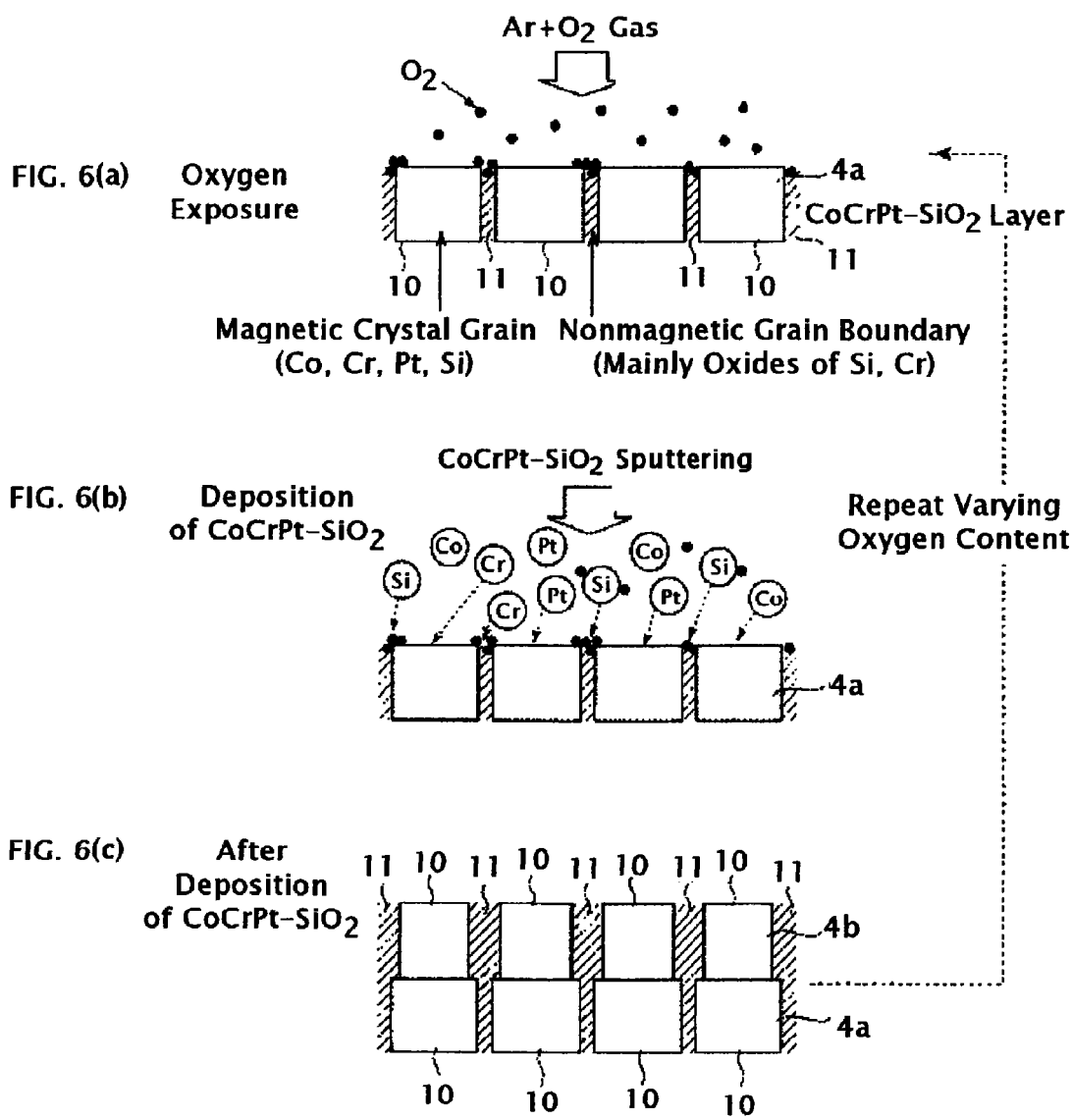

PERPENDICULAR MAGNETIC RECORDING MEDIUM AND METHOD FOR MANUFACTURING SAME

CROSS REFERENCE TO RELATED APPLICATIONS

This is a divisional of U.S. patent application Ser. No. 11/042,793 filed Jan. 25, 2005, now abandoned which in turn, claims priority from Japanese application Serial No. JP 2004-020427, filed on Jan. 28, 2004, the contents of which are incorporated herein in their entirety.

BACKGROUND OF THE INVENTION

A. Field of the Invention

The invention relates generally to a perpendicular magnetic recording medium mounted on various magnetic recording apparatuses and a method for manufacturing such a medium.

B. Description of the Related Art

In technologies for achieving high density magnetic recording, perpendicular magnetic recording is drawing attention as a substitute for conventional longitudinal magnetic recording.

Alloy materials of CoCrPt, CoCrTa, and the like have been used for a magnetic recording layer material of a perpendicular magnetic recording medium employing perpendicular magnetic recording. In these alloy materials, the nonmagnetic substance chromium segregates into a grain boundary and magnetically isolates each crystal grain for a magnetic recording medium so that it exhibits required characteristics such as high coercivity (Hc). The chromium segregation into the grain boundary has been promoted in the in-plane medium by controlling the deposition process, including heating and substrate bias voltage application.

In a perpendicular magnetic recording medium, however, the heating or substrate bias voltage application as conducted in the in-plane medium can segregate only a small amount of chromium, resulting in high media noise. To solve this problem, a granular medium has been proposed in which magnetic isolation of crystal grains is promoted by segregation of oxides or nitrides into the grain boundary. In a granular film of CoCrPt—$SiO_2$, for example, $SiO_2$ segregates surrounding the CoCrPt crystal grain. The granular film does not use phase separation (magnetic phase separation) of an alloy material, but features addition of an amorphous material such as an oxide or nitride that hardly makes a solid solution with an alloy material. The granular medium has been confirmed to reduce media noise in comparison with a conventional medium comprising a magnetic recording layer of CoCr alloy material. Therefore, the granular medium is deemed promising for magnetic recording media.

In order to further raise the recording density of a magnetic recording medium, magnetic isolation of the magnetic crystal grains in the magnetic recording layer must be promoted and magnetization reversal unit must be decreased. For media using a continuous film such as a granular medium, magnetic isolation of magnetic crystal grains in the magnetic recording layer is enhanced by promoting segregation of the nonmagnetic substance at the grain boundary. For discrete media such as patterned media the known methods attempt to decrease magnetization reversal unit by processing the magnetic recording layer using a technique such as etching employed in a semiconductor process. It has been difficult, however, to promote segregation in the granular magnetic recording layer by a process that is suitable for mass production.

To achieve a high density recording medium requires increased signal output at the high recording density in addition to noise reduction by promoting segregation. Perpendicular magnetic recording media are known to produce stable bits in high density recording. At the same time this means that taking out magnetic flux in high density recording is difficult. While a medium structure is required that achieves low noise and high signal output even at high recording density, such a medium structure has never been proposed.

There have been various problems in achieving the desired result. Because deposition of a granular film with substrate heating raises problems of mixing a nonmagnetic phase with an alloy phase and/or oxidation or nitridation of cobalt, the film must be deposited without substrate heating. However, film deposition without substrate heating cannot achieve sufficient isolation between the alloy phase and the nonmagnetic phase, which raises a problem of insufficient noise reduction. To solve this problem, heat treatment has been conducted at a high temperature from 400° C. to 600° C. after depositing the layers up to the magnetic recording layer (or to a protective film) without heating. Thus, proposals have been made to obtain a granular medium that has enough isolation of magnetic particles from nonmagnetic matrix and allows high density recording by carrying out heat treatment at a temperature not lower than 400° C. for 5 to 60 minutes in Japanese Unexamined Patent Application Publication No. 2000-306228 and at a temperature from 250° C. to 500° C. for 0.1 to 10 hours in Japanese Unexamined Patent Application Publication No. 2000-311329, for example. Heat treatment at such a high temperature and for relatively long time is not suitable for mass production.

Japanese Unexamined Patent Application Publication No. 2001-202611 proposes a technique to promote magnetic isolation of crystal grains in the magnetic recording layer, in which grain size of the magnetic layer is continuously varied along the film thickness direction. This document teaches varying the grain size of the magnetic layer along the film thickness direction by varying a ratio of magnetic material to nonmagnetic material in the magnetic recording layer. Specifically, separate targets are prepared for the magnetic material and the nonmagnetic material and power supplied in the sputtering process is changed in several (typically five) steps to vary mixing ratio of the magnetic material to the nonmagnetic material and to control the grain size. It is unfortunately very difficult to obtain a film that is homogeneous over a disk surface using an arrangement that places two targets in equipment for mass production. Therefore, this technique is not suitable for mass production.

There are further known examples: patterned media (Japanese Unexamined Patent Application Publication No. H10-233015, for example) and use of a self-organized film in which fine particles are arranged two-dimensionally. (Japanese Unexamined Patent Application Publication No. H10-320772 and Japanese Unexamined Patent Application Publication No. 2002-334414, for example.) However, none of these techniques is suitable for mass production.

The present invention is directed to overcoming or at least reducing the effects of one or more of the problems set forth above.

SUMMARY OF THE INVENTION

Therefore, an object of the present invention is to provide a perpendicular magnetic recording medium and a manufacturing method that allows reduction of noise and enhancement of S/N (output signal to noise ratio).

Another object of the invention is to provide a perpendicular magnetic recording medium and a manufacturing method that is suited to mass production and performs high density recording.

A perpendicular magnetic recording medium according to the present invention comprises at least a magnetic recording layer formed on a nonmagnetic substrate. The magnetic recording layer includes a plurality of magnetic crystal grains. Each magnetic crystal grain in the magnetic recording layer has a multilayer structure laminating a plurality of layers deposited at an initial stage to a final stage of forming the magnetic recording layer, and each magnetic crystal grain has a multilayer structure in which a diameter of the crystal grain is smaller in a final layer deposited at the final stage in a film surface side than the diameter in an initial layer deposited at the initial stage in a substrate side. Advantageously, the magnetic crystal grain having a multilayer structure is formed in a truncated cone shape that is smaller in a top face of the final layer deposited at the final stage than in a bottom face of the initial layer formed at the initial stage.

Preferably, the magnetic recording layer is composed by dispersing magnetic particles containing ferromagnetic materials in oxides or nitrides, and more preferably it is composed of a granular structure including a CoCrPt alloy dispersed in $SiO_2$.

The magnetic crystal grain having the multilayer structure preferably exhibits saturation magnetization varying from the initial layer deposited at the initial stage towards the final layer at the film surface. More particularly, the magnetic crystal grain having the multilayer structure exhibits increasing saturation magnetization from the initial layer deposited at the initial stage towards the final layer at the film surface.

The perpendicular magnetic recording medium according to the invention further comprises a soft magnetic backing layer, a nonmagnetic intermediate layer, and the magnetic recording layer comprising the above-mentioned magnetic crystal grains sequentially laminated on the nonmagnetic substrate.

A method of the present invention for manufacturing a perpendicular magnetic recording medium that comprises a magnetic recording layer formed on a nonmagnetic substrate in which the magnetic recording layer includes at least a plurality of magnetic crystal grains, is provided. The method includes a process for forming the magnetic recording layer, the process comprising a plurality of separate film deposition steps from a step conducted at an initial stage of the process in a substrate side to a step conducted at a final stage of the process in a film surface side in varied conditions. There is a concentration variation step that varies a concentration of oxygen or nitrogen contained in a gas for use in the film deposition steps. The concentration variation step is conducted during the plurality of film deposition steps, wherein the plurality of film deposition steps and the concentration variation step form the plurality of magnetic crystal grains each having a multilayer structure laminating layers, each layer corresponding to each of the film deposition steps from a step at an initial stage to a step at a final stage of the process for forming the magnetic recording layer. Each magnetic crystal grain has a diameter smaller in a final layer deposited at the final stage in the film surface side than a diameter in an initial layer deposited at the initial stage in a substrate side. Advantageously, the concentration of oxygen or nitrogen in the concentration variation step corresponding to each film deposition step increases with progression of the film deposition steps. Preferably each film deposition step from the step for depositing the initial layer at the initial stage to the step for depositing the final layer at the final stage is conducted in a gas containing the oxygen using a granular material including a CoCrPt alloy dispersed in $SiO_2$.

Another method of the invention for manufacturing a perpendicular magnetic recording medium that comprises at least a magnetic recording layer formed on a nonmagnetic substrate, the magnetic recording layer including a plurality of magnetic crystal grains, is provided. The method comprises a process for forming the magnetic recording layer, the process comprising a plurality of separate film deposition steps from a step conducted at an initial stage of the process in a substrate side to a step conducted at a final stage of the process in a film surface side in varied conditions, and exposure steps exposing a surface to a gas containing oxygen or nitrogen. Each exposure step is carried out as a pre-process to each film deposition step. The plurality of film deposition steps and exposure steps form the plurality of magnetic crystal grains each having a multilayer structure laminating layers. Each layer corresponds to each of the film deposition steps from a step at an initial stage to a step at a final stage of the process for forming the magnetic recording layer, and each magnetic crystal grain has a diameter smaller in a final layer deposited at the final stage in the film surface side than a diameter in an initial layer deposited at the initial stage in a substrate side. Advantageously, the exposure steps each corresponding to a film deposition step are conducted having the concentration of the oxygen or the nitrogen increase with progression of the exposure steps. Preferably each film deposition step from the step for depositing the initial layer at the initial stage to the step for depositing the final layer at the final stage is conducted in a gas containing the oxygen using a granular material including a CoCrPt alloy dispersed in $SiO_2$.

In a perpendicular magnetic recording medium according to the invention, each magnetic crystal grain in the magnetic recording layer has a multilayer structure and has a configuration like a truncated cone shape in which the diameter of the crystal grain of final layer deposited in the film surface side at the final stage is smaller than the diameter of the crystal grain in the initial layer deposited in the substrate side at the initial stage. As a result, signal output is enhanced and noises are reduced to improve S/N (signal output to noise ratio).

According to the invention, magnetic crystal grains having multilayer structure can be mass produced by a simple manufacturing method. A perpendicular magnetic recording medium of the invention attains high recording resolution and achieves high density recording.

BRIEF DESCRIPTION OF THE DRAWINGS

The foregoing advantages and features of the invention will become apparent upon reference to the following detailed description and the accompanying drawings, of which:

FIGS. 5(*a*) to 5(*d*) illustrate a film deposition process repeating oxygen exposure and film deposition steps in another method for manufacturing a perpendicular magnetic recording medium in a third embodiment according to the invention.

FIGS. 6(a) to 6(c) illustrate in detail a film deposition process comprising oxygen exposure and film deposition steps being different from the process of FIG. 4.

DETAILED DESCRIPTION OF SPECIFIC EMBODIMENTS

Some preferred examples of embodiment according to the present invention will be described in detail in the following with reference to accompanying drawings.

First Embodiment

This embodiment is described with reference to FIGS. 1 through 3, which disclose the structure of the medium.

Figure 1:
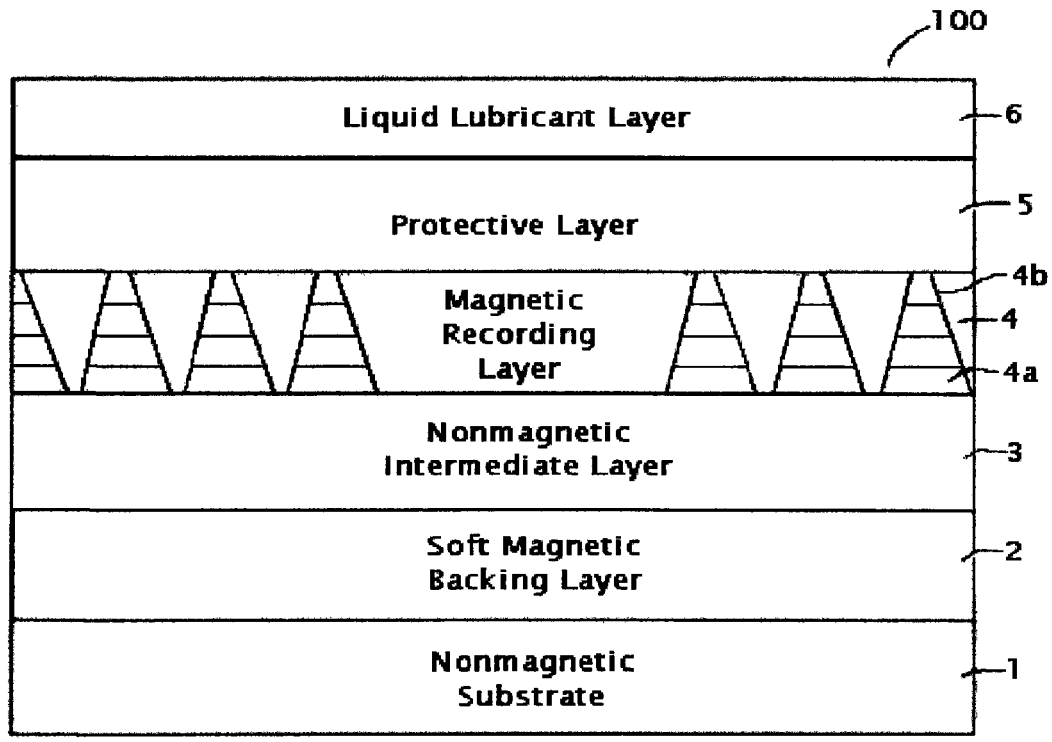
FIG. 1 is a schematic sectional view of a layer structure of a perpendicular magnetic recording medium of a first embodiment according to the invention.

FIG. 1 is a schematic sectional view of a structure of perpendicular magnetic recording medium 100 of the invention. Perpendicular magnetic recording medium 100 comprises nonmagnetic substrate 1, soft magnetic backing layer 2, nonmagnetic intermediate layer 3, magnetic recording layer 4, protective film 5, and liquid lubricant layer 6. A seed layer or a soft magnetic intermediate layer can be appropriately inserted between soft magnetic backing layer 2 and nonmagnetic intermediate layer 3.

Nonmagnetic substrate 1 can be any substrate having a smooth surface commonly used in a magnetic recording; medium. The substrate can be composed of NiP plated aluminum alloy, strengthened glass, crystallized glass, for example.

Soft magnetic backing layer 2 can be composed of crystalline FeTaC, Sendust alloy (FeSiAl), or amorphous cobalt alloy of CoZrNb or CoTaZr. Optimum thickness of soft magnetic backing layer 2 is in the range of 10 nm to 500 nm depending on the structure and characteristics of a magnetic head used for recording, taking productivity into consideration.

A seed layer, when provided on soft magnetic backing layer 2, can be composed of Ta, Zr, $Ni_3Al$ or the like. The seed layer, being nonmagnetic, is favorably as thin as possible from the view point of effective concentration of magnetic flux generated by the recording head into the soft magnetic backing layer, and is preferably in a range of 0.2 nm to 10 nm.

A soft magnetic intermediate layer, if provided, can be made of a permalloy such as NiFeAl, NiFeSi, NiFeNb, NiFeB, NiFeNbB, NiFeMo, or NiFeCr. Thickness of the permalloy underlayer is adjusted to attain optimum magnetic performance and read-write performance characteristics of the magnetic recording layer, and is preferably in a range of 3 nm to 50 nm, balancing between media performances and productivity.

Nonmagnetic intermediate layer 3 can be composed of ruthenium, a ruthenium-based alloy containing one or more additives selected from C, Cu, W, Mo, Cr, Ir, Pt, Re, Rh, Ta, and V, or a metal selected from Pt, Ir, Re, and Rh, though not limited to these materials. The thickness of nonmagnetic intermediate layer 3 needs to be as thin as possible to achieve high density recording without degrading magnetic performance or read-write performance characteristics of the magnetic recording layer, and is preferably in a range of 1 nm to 20 nm.

Magnetic recording layer 4 preferably comprises a ferromagnetic alloy material containing at least cobalt and platinum. The c-axis in the hexagonal closest packed structure of the material must align perpendicular to the film surface of the medium for a perpendicular magnetic recording medium. Magnetic recording layer 4 can be composed of a granular material, such as $CoPt—SiO_2$, CoCrPtO, $CoCrPt—SiO_2$, $CoCrPt—Al_2O_3$, CoPt—AlN, and $CoCrPt—Si_3N_4$. Magnetic recording layer 4 does not necessarily take a granular structure in a narrow meaning containing an oxide or a nitride, but can also be composed of an alloy material represented by CoCrPt.

Protective film 5 can be a thin film of substantially carbon. Other thin films that are commonly used for a protective film in a magnetic recording medium can also be used for protective film 5.

Liquid lubricant layer 6 can be composed of perfluoropolyether lubricant, for example. Other lubricants that are commonly used for a liquid lubricant layer in a magnetic recording medium can also be used.

Each of the layers laminated on nonmagnetic substrate 1 can be formed by a method selected from the film forming techniques that are generally used in the field of magnetic recording media. The layers with the exception of liquid lubricant layer 6 can be formed by DC magnetron sputtering, RF magnetron sputtering, or vacuum evaporation, for example. The liquid lubricant layer can be formed by dipping or spin-coating, for example.

Figure 2:
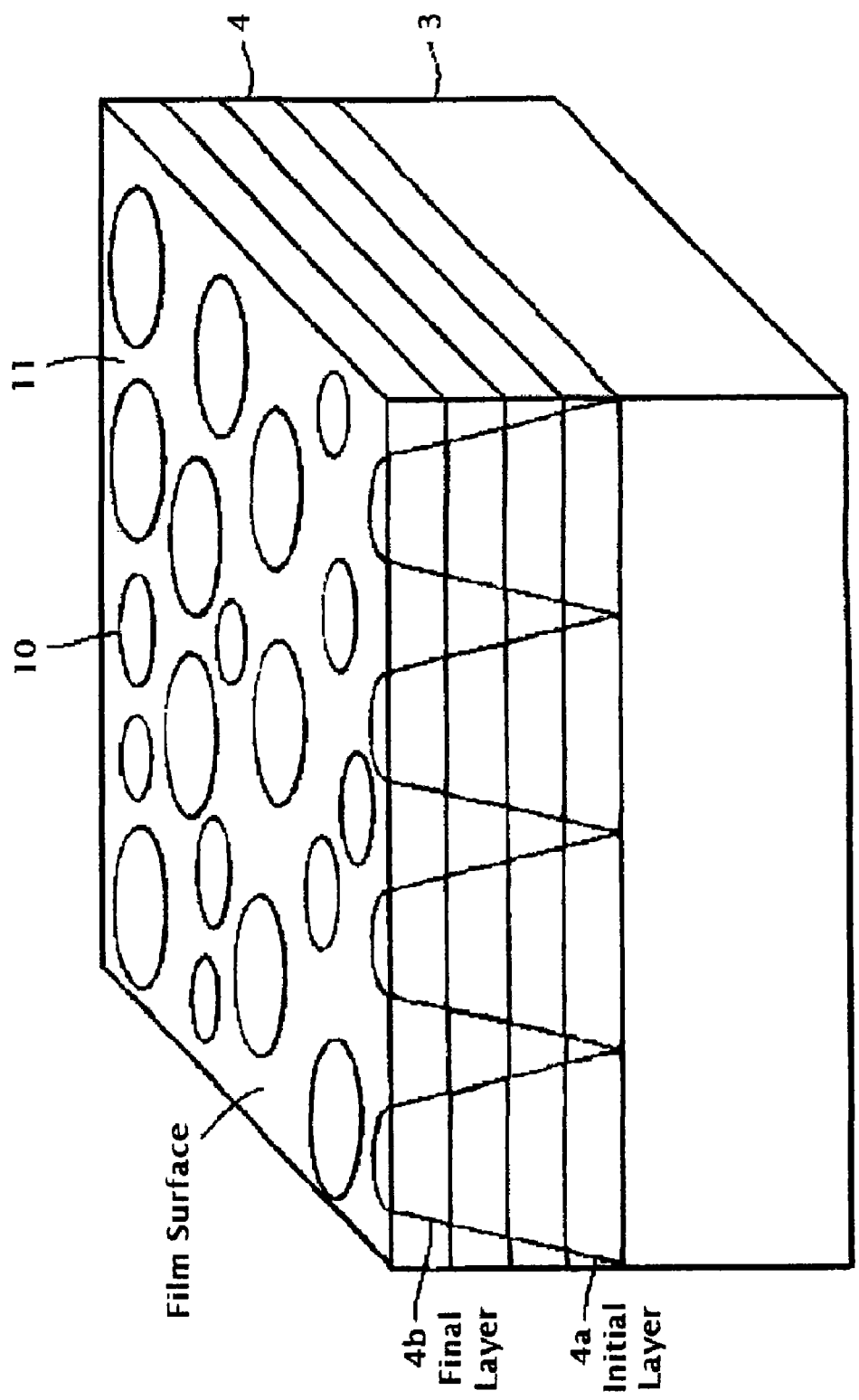
FIG. 2 is a perspective view showing planar and sectional structures of the magnetic recording layer.

FIG. 2 illustrates planar and sectional structures of the magnetic recording layer. Magnetic recording layer 4 consists of magnetic crystal grains 10 and nonmagnetic grain boundary 11. Magnetic crystal grain 10 has a configuration like a truncated cone shape. This configuration is simply referred to as a "truncated cone shape."

The following describes magnetic properties of magnetic recording layer 4 including magnetic crystal grains 10 that have a special configuration of a truncated cone shape.

Figure 3A:
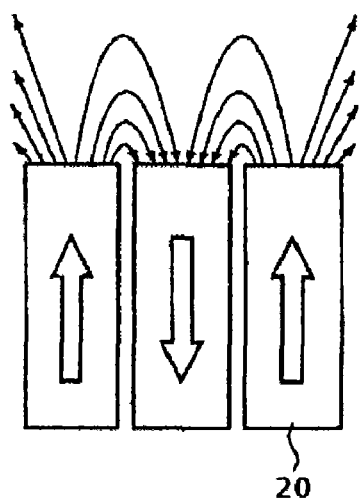
FIGS. 3(*a*) to 3(*c*) illustrate magnetic flux generated by various shapes of magnetic crystal grains.
Figure 3B:
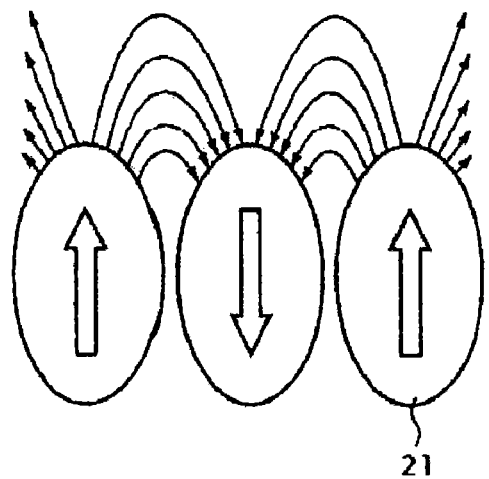
Figure 3C:
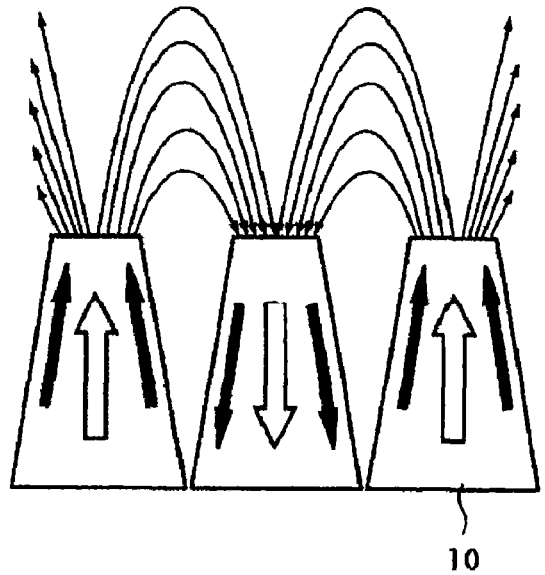

FIG. 3 shows different magnetic flux generated by different shapes of magnetic crystal grain, in comparison with conventional examples. Various patterns of flux flow are illustrated for conventional columnar magnetic crystal grains 20 in FIG. 3(a), for a shape of magnetic crystal grains 21 disclosed in Japanese Unexamined Patent Application Publication No. 2001-202611 in FIG. 3(b), and for magnetic crystal grains 10 with a configuration of a truncated cone shape according to the invention in FIG. 3(c).

In general, magnetic flux that flows out of a magnetic crystal grain flows back into a neighboring magnetic crystal grain having an inversely directed magnetic pole. Assuming equal volume of magnetic crystal grains, the larger the area of a magnetic pole is, the lower the magnetic flux density around the magnetic pole. The nearer the neighboring magnetic crystal grain is located, the smaller the loop through which the magnetic flux flows.

For columnar magnetic crystal grains 20 in FIG. 3(a) and magnetic crystal grains 21 with the shape disclosed in Japanese Unexamined Patent Application Publication No. 2001-202611 shown in FIG. 3(b), magnetic flux density tends to be low and further, magnetic flux easily flows back into the neighboring magnetic crystal grain and is difficult to be picked up at a position far from the grain surface. In contrast, for magnetic crystal grains 10 with the truncated cone shape according to the invention, magnetic flux tends to concentrate because of the small magnetic poles on the film surface and further, since a magnetic pole is distant from a neighboring magnetic pole on the film surface, the magnetic flux hardly flows back in a small loop and can be picked up with higher density and at a remote position.

The physical reason for higher saturation magnetization of magnetic crystal grain 10 around the film surface than at the initial stage of film deposition is as follows. Film deposition process according to the invention is conducted in such a way that an amount of oxygen or nitrogen (only a case of oxygen is described below) increases from the initial stage towards film surface. The increasing amount of oxygen initially oxidizes unreacted silicon, and subsequently oxidizes chromium, and the oxides of these elements precipitate at the grain boundary. Consequently, the (unreacted) silicon and chromium decrease in the magnetic crystal grain approaching the film surface. As a result, the saturation magnetization increases in the magnetic crystal grain as the film surface is approached.

Because magnetism is carried by cobalt in crystal grain 10 (CoCrPt+unreacted silicon), the saturation magnetization varies depending on the quantity of other nonmagnetic additive elements (Cr, Pt, Si). The saturation magnetization of the magnetic crystal grain increases with a decrease of the amount of additive elements. In the mechanism involved in the invention, the saturation magnetization of the magnetic crystal grain itself increases by discharging the nonmagnetic elements in magnetic crystal grains 10 to grain boundary 11 as oxides.

Because higher density magnetic flux can be picked up at a farther position from the film surface of magnetic recording layer 4 comprising the magnetic crystal grain as described above, low noise and high output can be simultaneously attained, and thus high density recording can be achieved. Since magnetic crystal grains 10 having a truncated cone shape can be readily obtained by controlling the deposition conditions of magnetic recording layer 4, this manufacturing method of the invention is suitable for mass production of perpendicular magnetic recording media 100.

Second Embodiment

The second embodiment of the invention is described below with reference to FIG. 4. Corresponding parts from the first embodiment are given the same symbol, and their description is omitted.

The second embodiment describes a manufacturing method for perpendicular magnetic recording medium 100 comprising magnetic recording layer 4 that includes magnetic crystal grains 10 with a configuration like a truncated cone shape, in which a grain diameter on the film surface is smaller than a grain diameter at the initial stage. In the manufacturing method, the amount of oxygen or nitrogen introduced in the process of depositing magnetic recording layer 4 is adjusted to vary the amount of oxidized or nitrided metals in the magnetic recording material and vary diameter of magnetic crystal grains 10, thereby forming a truncated cone shape. More particularly, the amount of oxygen introduced in the process of depositing the magnetic recording layer is adjusted to vary the amount of oxidized metals in the magnetic recording material and vary the diameter of magnetic crystal grain 10, thereby forming a truncated cone shape.

In the example disclosed in Japanese Unexamined Patent Application Publication No. 2001-202611, the ratio of compositions of magnetic material and nonmagnetic material are varied. In the method of the invention, the amount of oxidized metals contained in the magnetic material varies along the thickness direction. As a result, the composition itself of the magnetic material varies continuously along the thickness direction.

Since magnetic crystal grain 10 has a truncated cone shape according to the invention, magnetic isolation of magnetic crystal grains 10 is promoted due to physical separation. In addition, owing to the effect of the shape of crystal grain, magnetic flux hardly diverges and signal intensity is enhanced, which results in improved recording resolution.

By including chromium or the like that is more readily oxidized than cobalt carrying magnetism in magnetic recording layer 4, the chromium or the like is preferentially oxidized when oxygen is introduced, thereby continuously varying saturation magnetization of magnetic crystal grain 10 along the thickness direction. By making the saturation magnetization larger around the surface than at the initial stage of growth of magnetic crystal grain 10, the effect of magnetic flux concentration is further enhanced.

Manufacturing Example 1

A chemically reinforced glass substrate (N-10 glass substrate made by HOYA Corporation, for example) having a smooth surface was used for nonmagnetic substrate 1. After cleaning, nonmagnetic substrate 1 was introduced into a sputtering apparatus. A CoZrNb amorphous soft magnetic backing layer 2 with a thickness of 200 nm was deposited using a target of 87 at % Co—5 at % Zr—8 at % Nb. Then, a NiFeSi underlayer 11 nm thick was deposited using a permalloy target of 82 at % Ni-12 at % Fe-6 at % Si. Subsequently, nonmagnetic intermediate layer 3 of ruthenium having a thickness of 10 nm was deposited under an argon gas pressure of 4.0 Pa using a ruthenium target.

Then magnetic recording layer 4 of CoCrPt—$SiO_2$ having a thickness of 10 nm was deposited under a gas pressure of 5.3 Pa using a target of 90 mol % (74 at % Co—12 at % Cr—14 at % Pt)—10 mol % ($SiO_2$). In this step, the initial deposition from the start of deposition to a film thickness of 0.5 nm was conducted in an atmosphere of only argon without addition of oxygen. Once the film thickness reached about 0.5 nm, oxygen addition was started and oxygen content in the argon gas was gradually increased to 2% at the time of completion of the deposition step. The deposition of magnetic recording layer 4 of CoCrPt—$SiO_2$ was conducted in 4.0 seconds. Oxygen was not added in 0.2 sec from the start of deposition. After 0.2 sec from the start of deposition, oxygen gas flow rate in argon gas was varied at a rate of 0.53%/sec.

Finally, protective film 5 of carbon having a thickness of 7 nm was deposited using a carbon target, then the laminated substrate was taken out from the vacuum chamber. The deposition steps of all layers other than nonmagnetic intermediate layer 3 of ruthenium and magnetic recording layer 4 of CoCrPt—$SiO_2$ were conducted by DC magnetron sputtering under an argon gas pressure of 0.67 Pa. Next, liquid lubricant layer 6 of perfluoropolyether having thickness of 2 nm was formed by a dipping method. Thus, perpendicular magnetic recording medium 100 was manufactured.

A medium comprising magnetic recording layer 4 having a film thickness of 0.5 nm was also manufactured in order to compare diameters of crystal grains at an initial stage and on the film surface in magnetic recording layer 4.

The present method differs in several respects from the conventional manufacturing method. FIG. 4 illustrates a method for manufacturing a perpendicular magnetic recording medium according to the invention. A target of CoCrPt—$SiO_2$ is solely used. The amount of oxygen introduced in the atmosphere of the process is adjusted to control the amount of oxides.

Figure 4A:
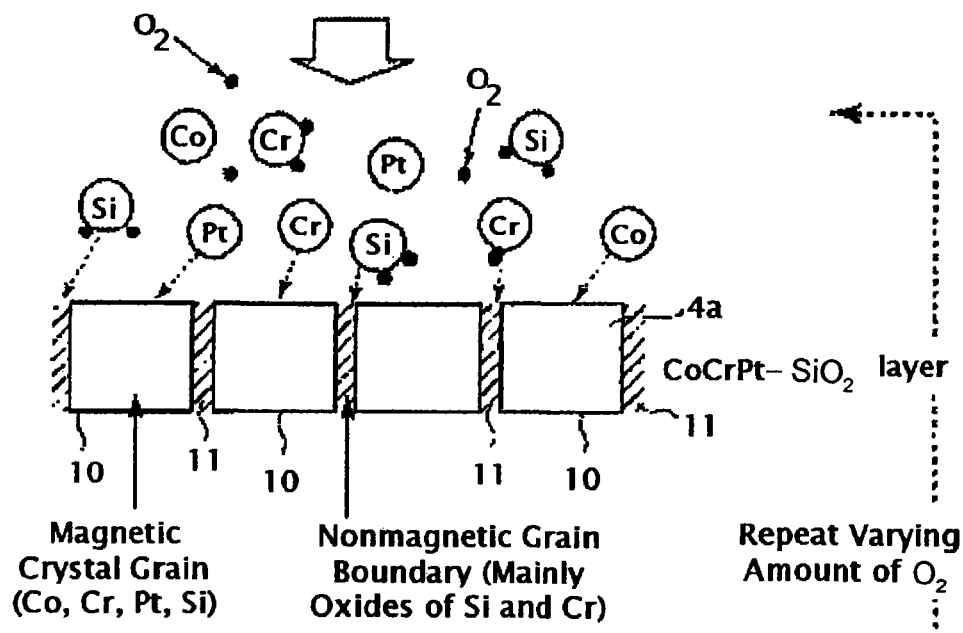
FIGS. 4(*a*) to 4(*b*) illustrate a process in a method for manufacturing a perpendicular magnetic recording medium in a second embodiment according to the invention.
Figure 4B:
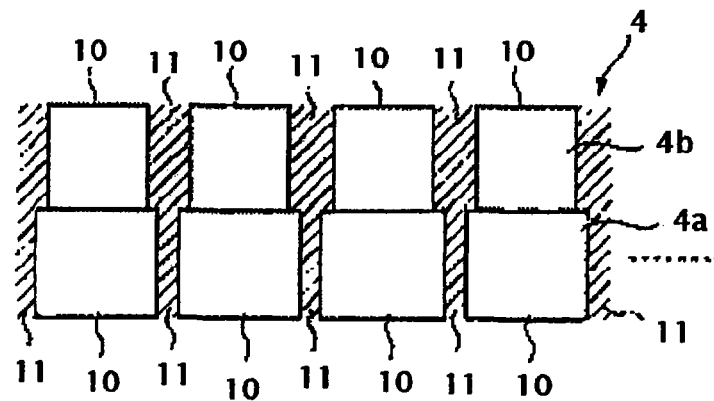

In the case oxygen is introduced as shown in FIG. 4(a), unreacted silicon is first oxidized, and then chromium is oxidized. These nonmagnetic oxides deposit in the grain boundary. Thus, first layer 5a (initial layer at the initial stage of film deposition) composed of CoCrPt—SiO₂ is first formed. Next, increasing the amount of oxygen over the previous process, a film deposition process similar to FIG. 4(a) is conducted to deposit second layer 4b composed of CoCrPt—SiO₂ as shown in FIG. 4(b). Similar deposition processes are conducted while gradually increasing the amount of oxygen, resulting in magnetic crystal grain 10 having a "truncated cone" shape as shown in FIG. 2.

Since the oxidation proceeds in the order of Si, Cr, to Co because of affinity for the oxygen, degradation of magnetism due to oxidation of cobalt does not occur unless excessive oxygen is added. In the example of Japanese Unexamined Patent Application Publication No. 2001-202611, targets of CoPt and SiO₂ are prepared and discharged at the same time (a technique called co-sputtering), adjusting electric power supplied to each target (to adjust the depositing rate of each target) to control ratio of compositions in the deposited film. Thus, the method in Japanese Unexamined Patent Application Publication No. 2001-202611 uses the targets of CoPt and SiO₂ and controls the composition by adjusting the supplied power as described above, while the manufacturing method of the invention controls the composition according to the amount of the introduced oxygen. This point is a difference between the two methods. The same effect can be obtained using a reaction gas of nitrogen as well as the oxygen.

The manufacturing method described above makes magnetic crystal grains 10 in magnetic recording layer 4 have a configuration like a truncated cone shape, in which the diameter of the crystal grain is smaller at the film surface than the diameter of the crystal grain at the initial stage. As a result, the magnetic isolation of the magnetic crystal grains is promoted and the magnetic flux generated by magnetic crystal grains 10 reaches farther from the film surface of magnetic recording layer 4. Therefore, higher signal intensity and signal to noise ratio (S.N) are attained even in high density recording.

Third Embodiment

The third embodiment of the invention is described with reference to FIG. 5 and FIG. 6. The same symbols as in the previous examples are given to the corresponding parts in this example and their description is omitted.

This embodiment is a manufacturing method with repeating cycles, where each cycle comprises a film deposition step and an exposure step. The film deposition steps separately deposit each of the layers from a layer in a substrate side at an initial stage to a layer in a film surface side at a final stage in varied conditions. The exposure steps expose a surface to a gas containing oxygen or nitrogen, and each exposure step is carried out as a pre-process to each film deposition step. This manufacturing method differs from the method of second embodiment described previously. The exposure steps corresponding to each film deposition step can be conducted having concentrations of the oxygen or the nitrogen increased with progression of the exposure steps.

Manufacturing Example 2

Next, a manufacturing example of perpendicular magnetic recording medium 10 is described. The layers up to nonmagnetic intermediate layer 3 of ruthenium were formed in the same manner as in the manufacturing example 1.

Magnetic recording layer 4 of CoCrPt—SiO₂ having a thickness of 10 nm was formed using a target of 90 mol % (74 at % Co—12 at % Cr—14 at % Pt)—10 mol % (SiO₂). A step of depositing 0.5 nm of magnetic recording layer 4 and a step of exposing the surface to oxygen subsequent to each deposition step were conducted alternately. The oxygen concentration to which the layer surface was exposed was gradually varied from 0.2% to 2%. Specifically, a process to deposit 0.5 nm (corresponding to 0.2 sec) of magnetic recording layer 4 under an argon gas pressure of 5.3 Pa and a step to introduce an argon gas containing oxygen for 0.2 sec were repeated. The gas pressure in the surface exposure step to the argon plus oxygen gas was 1.3 Pa. The total number of cycles of oxygen introduction was 19. Initially introduced oxygen concentration was 0.2%, increasing by 0.1% at every introduction step, and the oxygen concentration reached 2% at the final introduction. Then, carbon protective film 5 and liquid lubricant layer 6 were formed in the same manner as in the manufacturing example 1, to complete perpendicular magnetic recording medium 100.

A medium comprising magnetic recording layer 4 having a film thickness of 0.5 nm was also manufactured in order to compare diameters of a layer of a crystal grain at an initial stage (the initial layer) and a layer on the film surface (the final layer) in magnetic crystal grain 10 of magnetic recording layer 4.

As described above, magnetic crystal grain 10 having a multilayer structure in magnetic recording layer 4 has a truncated cone shape in which the diameter of crystal grain in the final layer on the film surface is smaller than the diameter of crystal grain in the initial layer at the initial stage of growth. Consequently, magnetic isolation of magnetic crystal grains 10 is promoted, and noise reduction and signal output enhancement are achieved.

Next, the conditions for oxygen exposure of the magnetic recording layer are described. These include conditions in the film deposition step, layer construction in the case of oxygen exposure, and oxidation process of grain boundaries. FIG. 5 shows the film deposition process using repeating oxygen exposure and film deposition. Concerning conditions in oxygen exposure, a mechanism of "oxygen exposure" in this embodiment is described as compared to "oxygen addition" in the manufacturing method of second embodiment.

Condition in the Film Deposition Step

A film deposition condition in the case of oxygen exposure is compared. In the oxygen exposure in this embodiment, film deposition is conducted under a constant power supply and constant gas composition (basically, pure argon without oxygen addition).

As shown in manufacturing example 2 and in FIG. 5, first layer 5a (initial layer), second layer 4b, . . . , a layer on the film surface (final layer) are sequentially laminated by alternately repeating steps of film deposition and oxygen exposure in a sequence like (a) deposition, (b) exposure, (c) deposition, (d) exposure, (e) deposition . . . . In the exposure steps, oxygen concentration in the exposure gas is gradually changed as the film thickness increases. Because an actual thickness of one layer deposited in one deposition step is extraordinarily small (0.5 nm for example), adsorbed oxygen generates sufficient oxide to expand the grain boundary.

In the case of oxygen addition in the second embodiment, as shown in manufacturing example 1 and in FIG. 4, the electric power supplied in the film deposition step is constant, while oxygen content in the gas is continuously varied.

Layer Construction in the Case of Oxygen Exposure

A layer structure in the case of oxygen exposure is compared. In the case of oxygen exposure in this third embodiment, oxygen is adsorbed on the grain boundary in precedence. In the deposition step after the oxygen exposure, silicon and chromium are oxidized by the oxygen adsorbed on the grain boundary and precipitate on the grain boundary as oxides. By varying the amount of oxygen added in the exposure steps, the proportion of magnetic crystal grains 10 (metallic substance) to grain boundary 11 (oxide) can be varied. The intermittent deposition that repeats the exposure and deposition steps according to the invention suppresses growth of magnetic crystal grain 10, decreasing diameter of the crystal grain as the film surface is approached.

In the case of the film deposition step with oxygen addition in the second embodiment described previously, silicon and chromium included in CoCrPt containing unreacted silicon are oxidized by oxygen contained in the processing gas of the film deposition step, and precipitate in the grain boundary. The proportion of magnetic crystal grain 10 (metallic substance) to grain boundary 11 (oxide) varies depending on the content of oxygen in the process gas in the film deposition step.

Oxidation Process of Grain Boundary

An oxidation process of grain boundary 11 is compared. FIG. 6 shows the process of oxygen exposure followed by film deposition of FIG. 5 more in detail. The process of FIG. 6 is different from the process of FIG. 4.

In the case of oxygen exposure plus film deposition, silicon and chromium react and are oxidized by the oxygen adsorbed on grain boundary 11 after reaching the film surface. In the sputtering process shown in FIG. 6(b) after the oxygen exposure step shown in FIG. 6(a), the material of the target is bombarded and scattered not in a form of a particle of CoCrPt—SiO$_2$ but in a form separate atoms which move towards the substrate. Then, the atoms become an alloy or an oxide again on or around the substrate surface.

Every element has an order of possibility of oxidation; among Co, Cr, Pt, and Si, the order of readiness of oxidation is Si, Cr, Co, to Pt. Consequently, on addition of oxygen to these elements, silicon is oxidized first. After all of the silicon is oxidized, then chromium is oxidized. Cobalt is not oxidized generally unless all of the chromium is oxidized. When nitrogen is added to Co, Cr, Pt, and Si, the order of nitridation is the same as in the case of oxygen. Nitrides are formed in a process in which the separately scattered silicon and chromium react on the film surface with nitrogen adsorbed on grain boundary 11 and nitrides deposit there, and the layer structure of laminated crystal grain 11 results as shown in FIG. 6(c).

Unlike this situation, in the case of the film deposition with oxygen addition in the second embodiment shown in FIG. 4, the silicon and chromium react and are oxidized with the oxygen mainly in the deposition process gas before reaching the substrate. Oxides are formed in the process in which the separately scattered silicon and chromium react with the added oxygen in the gas phase and then deposit, and the layer structure of laminated grain boundary 11 results as shown in FIG. 4(b).

Fourth Embodiment

The fourth embodiment according to the invention is described with reference to Tables 1 and 2, and FIGS. 7 and 8. The same symbols are given to parts corresponding to the parts in the previous examples and description is omitted.

In this embodiment, a comparative perpendicular magnetic recording medium was manufactured, and perpendicular magnetic recording media 100 of manufacturing example 1 of the second embodiment and the manufacturing example 2 of the third embodiment were evaluated. The comparative perpendicular magnetic recording medium (referred to as comparative example 1) was manufactured in the same manner as in the manufacturing example 1 except that magnetic recording layer 4 was deposited in pure argon gas at a pressure of 5.3 Pa.

Perpendicular magnetic recording medium 100 comprising magnetic recording layer 4 having a thickness of 0.5 nm was also manufactured as in the manufacturing example 1 to compare the diameter of magnetic crystal grain 10 in magnetic recording layer 4 at the layer at the initial stage of growth (an initial layer) and at the layer in the film surface (a final layer).

Signal output, media noise, signal output to noise ratio (S/N), and D50 (the linear recording density at which the output decreases to half of the maximum value) were measured on perpendicular magnetic recording media 100 were obtained as described above using a read/write tester, and compared.

Read-Write Performance Characteristics

Table 1 shows the measured results of read-write performance characteristics of the perpendicular magnetic recording media of manufacturing examples 1 and 2 and comparative example 1. More particularly, Table 1 shows read-write performance characteristics of truck average signal output (TAA), normalized media noise, S/N, which were measured at a linear density of 367 kfci, and D50.

TABLE 1

|  | manufacturing example 1 | manufacturing example 2 | comparative example 1 |
| --- | --- | --- | --- |
| TAA at 367 kfci (mVp-p) | 1.04 | 1.12 | 0.84 |
| media noise at 367 kfci (µVrms/mVp-p) | 24.5 | 25.4 | 29.1 |
| S/N at 367 kfci (dB) | 21.0 | 21.1 | 20.2 |
| D$_{50}$ (kfci) | 423 | 438 | 379 |

In manufacturing examples 1 and 2, TAA increases, media noise decreases, and, as a result, S/N is improved by about 1 dB as compared to example 1. The D$_{50}$ represents recording resolution of a perpendicular magnetic recording medium. Large value of this quantity means possibility of high density recording. The D$_{50}$ is improved by 12% to 16% in manufacturing examples 1 and 2 over comparative example 1, which demonstrates that high density recording has been achieved.

Mean Diameter of Crystal Grains

To find the reason for the improvement in the electromagnetic conversion characteristics, images on a transmission electron microscope (TEM) were compared on the perpendicular magnetic recording medium of manufacturing examples 1 and 2 and comparative example 1. Table 2 shows mean diameters of crystal grains calculated from the TEM images shown in FIG. 7.

Figure 7:
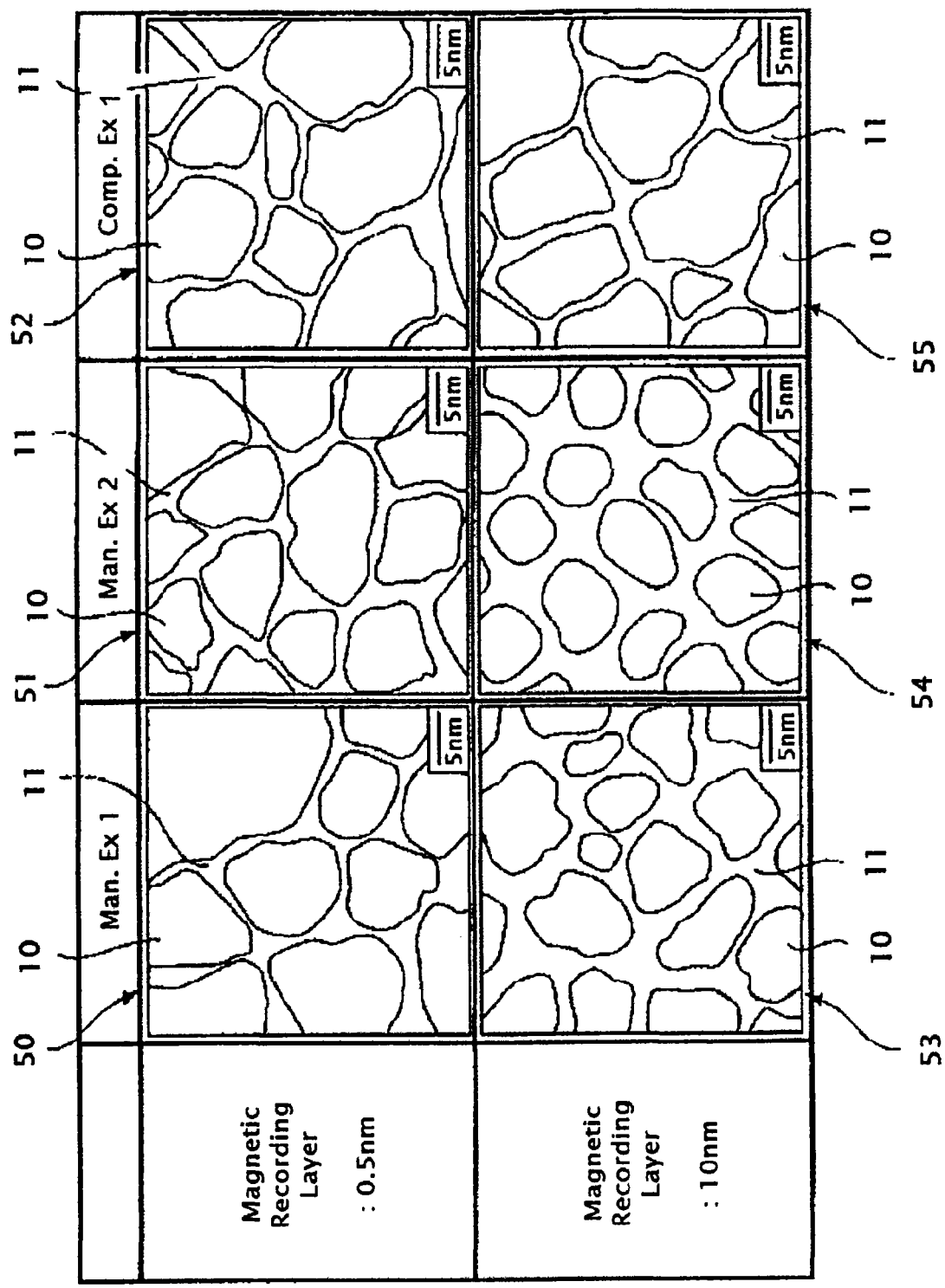
FIG. 7 shows planar TEM images of magnetic recording layers with different thicknesses in perpendicular magnetic recording media.
Figure 8:
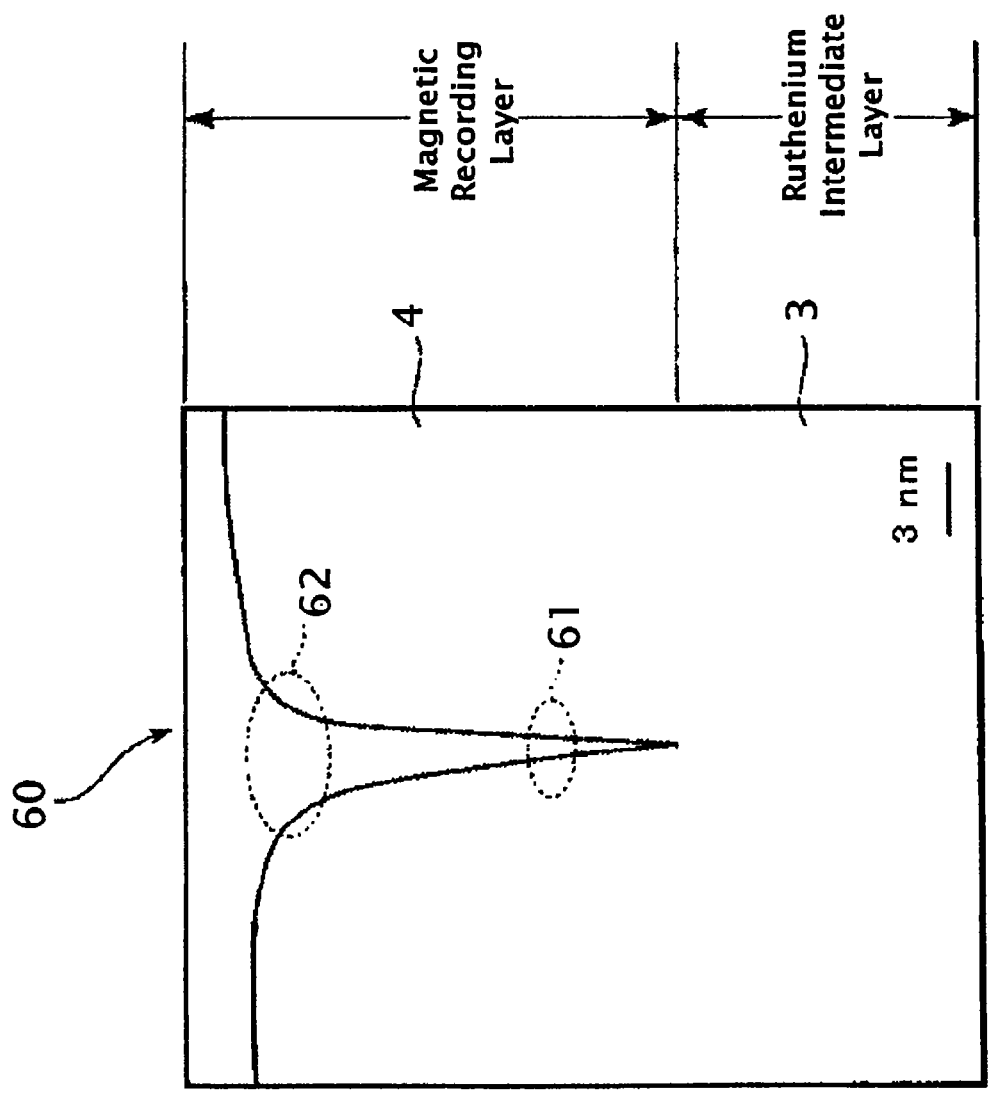
FIG. 8 shows a cross-sectional TEM image of the perpendicular magnetic recording medium of manufacturing example 1.

FIG. 7 shows planar TEM images at a film thickness of 0.5 nm and planar TEM images at a film thickness of 10 nm of magnetic recording layer 4 in the perpendicular magnetic recording media of manufacturing examples 1 and 2 and comparative example 1.

TABLE 2

| film thickness of magnetic recording layer | mean diameter of crystal grain (nm) | | |
| --- | --- | --- | --- |
| | manufacturing example 1 | manufacturing example 2 | comparative example 1 |
| 0.5 nm | 9.3 | 9.2 | 9.2 |
| 10 nm | 6.6 | 6.1 | 9.8 |

In the planar TEM images of the magnetic recording layer at a film thickness of 0.5 nm, no difference in crystal grain diameter and grain isolation was observed between the manufacturing examples 1 and 2 and the comparative example 1. On the other hand, in the planar TEM images of magnetic recording layer 4 at a film thickness of 10 nm, the comparative example 1 is remarkably different from the manufacturing examples 1 and 2. Crystal grain diameter 10 of the magnetic recording layer at a film thickness of 10 nm, as compared with magnetic recording layer 4 at a film thickness of 0.5 nm, is larger in the comparative example 1, and is decreased down to 65 to 70% in the manufacturing examples 1 and 2. In the manufacturing examples 1 and 2, grain boundary 11 has significantly expanded corresponding to shrinkage in the diameter of crystal grains 10.

Sectional Structure

To examine a sectional structure in this configuration of growth, cross-sectional TEM observation was conducted on the perpendicular magnetic recording media. FIG. 8 is a sectional TEM image of the perpendicular magnetic recording medium of manufacturing example 1. Distance between crystal grains of magnetic recording layer 4 at an initial stage of growth is not larger than 0.5 nm as shown in region 61. On the other hand, the distance between crystal grains of magnetic recording layer 4 on the film surface is about 3 nm as shown in region 62. Thus, crystal grains 10 in magnetic recording layer 4 in the perpendicular magnetic recording medium 100 of manufacturing example 1 have been shown to have a configuration like a truncated cone shape in which diameter of the crystal grain is smaller on the film surface than at the initial stage of growth.

Sectional TEM observation on manufacturing example 2 and comparative example 1 demonstrated that perpendicular magnetic recording medium 100 of manufacturing example 2 was confirmed to show a configuration of growth like a truncated cone shape just as perpendicular magnetic recording medium 100 of manufacturing example 1, while the perpendicular magnetic recording medium of comparative example 1 showed a cylindrical configuration of growth. These results on sectional TEM observation agree well with the results on planar TEM observation.

Although the manufacturing methods are different between manufacturing examples 1 and 2, configuration of growth of magnetic recording layer 4 is the same configuration like a truncated cone shape. Consequently, the configuration of growth can produce improvements in electromagnetic conversion characteristics including noise reduction and signal output enhancement of perpendicular magnetic recording medium 100.

Thus, a perpendicular magnetic recording medium mounted on various magnetic recording apparatuses and a method for manufacturing such a medium has been described according to the present invention. Many modifications and variations may be made to the techniques and structures described and illustrated herein without departing from the spirit and scope of the invention. Accordingly, it should be understood that the media and methods described herein are illustrative only and are not limiting upon the scope of the invention.

What is claimed is:

1. A method for manufacturing a perpendicular magnetic recording medium that comprises a magnetic recording layer formed on a nonmagnetic substrate, the magnetic recording layer including a plurality of magnetic crystal grains, the method including a process for forming the magnetic recording layer that comprises:

conducting a plurality of film depositions, from a first deposition conducted at an initial stage of the process at a substrate side to a final deposition conducted at a film surface side, and varying concentration of oxygen or nitrogen that is contained in a gas used in the film deposition steps, during each of the plurality of film depositions, wherein the concentration of oxygen or nitrogen increases with progression of the film depositions, wherein the plurality of film depositions while concentration is varied produces a plurality of magnetic crystal grains each having a laminated multilayer structure, in which each layer corresponds to one of the film depositions, and a diameter of the magnetic crystal grain deposited in the final deposition is less than a diameter of the magnetic crystal grain deposited in the first deposition.

2. The method according to claim 1, wherein each film deposition from the first to the final is conducted in a gas containing oxygen using a granular material including a CoCrPt alloy dispersed in $SiO_2$.

3. A method for manufacturing a perpendicular magnetic recording medium that comprises a magnetic recording layer formed on a nonmagnetic substrate, the magnetic recording layer including a plurality of magnetic crystal grains, the method comprising a process for forming the magnetic recording layer that comprises:

conducting a plurality of film depositions, from a first deposition conducted at an initial stage of the process at a substrate side to a final deposition conducted at a film surface side, and exposure of a surface formed during each of said film depositions to a gas containing oxygen or nitrogen before conducting the next film deposition, wherein the concentration of oxygen or nitrogen increases with each subsequent film deposition, wherein the plurality of film depositions and intervening exposures to oxygen or nitrogen produces a plurality of magnetic crystal grains each having a laminated multilayer structure, in which each layer corresponds to one of the film depositions, and a diameter of the magnetic crystal grain deposited in the final deposition is less than a diameter of the magnetic crystal grain deposited in the first deposition, wherein the concentration of oxygen or nitrogen increases with progression of the exposures.

4. The method according to claim 3, wherein each film deposition from the first to the final is conducted in a gas containing the oxygen using a granular material including a CoCrPt alloy dispersed in $SiO_2$.

5. A method for manufacturing a perpendicular magnetic recording medium that comprises a magnetic recording layer comprising CoCrPt alloy formed on a nonmagnetic substrate, the magnetic recording layer including a plurality of magnetic crystal grains, the method including a process for forming the magnetic recording layer that comprises:

conducting a plurality of film depositions, from a first deposition conducted at an initial stage of the process at a substrate side to a final deposition conducted at a film surface side, and varying concentration of oxygen or nitrogen that is contained in a gas used in the film deposition steps, during the plurality of film depositions, wherein the plurality of film depositions while concentration is varied produces a plurality of magnetic crystal grains each having a laminated multilayer structure, in which each layer corresponds to one of the film depositions, and a diameter of the magnetic crystal grain deposited in the final deposition is less than a diameter of the magnetic crystal grain deposited in the first deposition, and wherein the concentration of oxygen or nitrogen during the final deposition of the magnetic recording layer is set so that Co is not oxidized or nitrided.

6. A method for manufacturing a perpendicular magnetic recording medium that comprises a magnetic recording layer formed on a nonmagnetic substrate, the magnetic recording layer including a plurality of magnetic crystal grains, the method comprising a process for forming the magnetic recording layer that comprises:

conducting a plurality of film depositions, from a first deposition conducted at an initial stage of the process at a substrate side to a final deposition conducted at a film surface side, and exposure of a surface formed during each of said film depositions to a gas containing oxygen or nitrogen before conducting the next film deposition, wherein the concentration of oxygen or nitrogen increases with progression in each film deposition, and wherein the plurality of film depositions and intervening exposures to oxygen or nitrogen produces a plurality of magnetic crystal grains each having a laminated multilayer structure, in which each layer corresponds to one of the film depositions, and a diameter of the magnetic crystal grain deposited in the final deposition is less than a diameter of the magnetic crystal grain deposited in the first deposition, and wherein the concentration of oxygen or nitrogen during the final deposition of the magnetic recording layer is set so that Co is not oxidized or nitrided.

* * * * *